(12) United States Patent
Blackledge

(10) Patent No.: US 10,432,531 B2
(45) Date of Patent: Oct. 1, 2019

(54) TAPPING NETWORK DATA TO PERFORM LOAD BALANCING

(71) Applicant: PAYPAL, INC., San Jose, CA (US)

(72) Inventor: Clive Blackledge, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 136 days.

(21) Appl. No.: 15/194,945

(22) Filed: Jun. 28, 2016

(65) Prior Publication Data
US 2017/0373977 A1    Dec. 28, 2017

(51) Int. Cl.
| | | |
|---|---|---|
| *H04L 12/803* | (2013.01) | |
| *H04L 29/06* | (2006.01) | |
| *H04L 29/08* | (2006.01) | |

(52) U.S. Cl.
CPC ............ *H04L 47/125* (2013.01); *H04L 63/08* (2013.01); *H04L 63/12* (2013.01); *H04L 67/141* (2013.01); *H04L 67/28* (2013.01); *H04L 69/16* (2013.01); *H04L 69/163* (2013.01); *H04L 67/1008* (2013.01)

(58) Field of Classification Search
None
See application file for complete search history.

(56) References Cited

U.S. PATENT DOCUMENTS

| | | |
|---|---|---|
| 6,888,797 B1 | 5/2005 | Cao et al. |
| 7,706,378 B2 | 4/2010 | Lincoln et al. |
| 7,953,973 B2 | 5/2011 | Beam et al. |
| 8,239,960 B2 | 8/2012 | Frattura et al. |
| 8,248,928 B1 | 8/2012 | Wang et al. |
| 8,285,881 B2 | 10/2012 | Elzur |
| 8,614,950 B2 | 12/2013 | Roitshtein et al. |
| 8,929,356 B2 | 1/2015 | Pandey et al. |
| 2006/0268732 A1 | 11/2006 | Smith |
| 2008/0072226 A1* | 3/2008 | Armes ............... G06F 9/505 718/101 |
| 2016/0094418 A1* | 3/2016 | Raney ............... H04L 43/028 370/241 |
| 2016/0210633 A1* | 7/2016 | Epelman ........... G06Q 20/4016 |
| 2016/0285722 A1* | 9/2016 | Min ..................... H04L 43/0876 |
| 2017/0048312 A1* | 2/2017 | Moyer ............... H04L 67/1095 |
| 2017/0161734 A1* | 6/2017 | Bankston ........... G06Q 20/3829 |
| 2017/0214703 A1* | 7/2017 | Tekchandani ....... H04L 63/1425 |
| 2017/0237554 A1* | 8/2017 | Jacobs ................ H04L 9/0819 713/171 |

\* cited by examiner

*Primary Examiner* — Marcus Smith
(74) *Attorney, Agent, or Firm* — Haynes and Boone LLP

(57) ABSTRACT

Methods, systems, and computer program products are included for load balancing processing of a data stream that is communicated over a network. An exemplary method includes establishing a communication session over a network between a source endpoint device and a destination endpoint device. A network device in the network receives a data stream that is communicated to the destination endpoint device from the source endpoint device during the communication session. The network device provides data corresponding to the data stream to a processing device. The processing device identifies a portion of the data that is assigned to the processing device and performs operations to process the portion of the data. After performing the operations, the processing device communicates a response corresponding to the processing to the source endpoint device by way of the destination endpoint device.

20 Claims, 4 Drawing Sheets

TAPPING NETWORK DATA TO PERFORM LOAD BALANCING

BACKGROUND

Field of the Invention

The present disclosure generally relates to electrical computers and digital data processing systems, and more particularly to load balancing.

Related Art

Load balancing is traditionally performed to distribute computer processing tasks across a plurality of computing devices. Generally, the goal of load balancing is to spread a workload corresponding to the computer processing tasks in a manner that avoids overly burdening any particular computing device. Some of the many benefits of load balancing include reducing processing time, improving network response time, and providing failover safeguards.

A network configuration for load balancing typically includes one or more load balancing servers that receive requests from clients and distribute the requests to other computing devices for processing. In many instances, the other computing devices provide indications to the load balancing servers regarding current workload statistics, such as network bandwidth and processing time. The load balancing servers input these indications into scheduling algorithms that are used to assign the requests to particular computing devices for processing.

BRIEF DESCRIPTION OF THE DRAWINGS

The present invention is illustrated by way of example and not limitation in the figures of the accompanying drawings.

DETAILED DESCRIPTION

Figure 1:
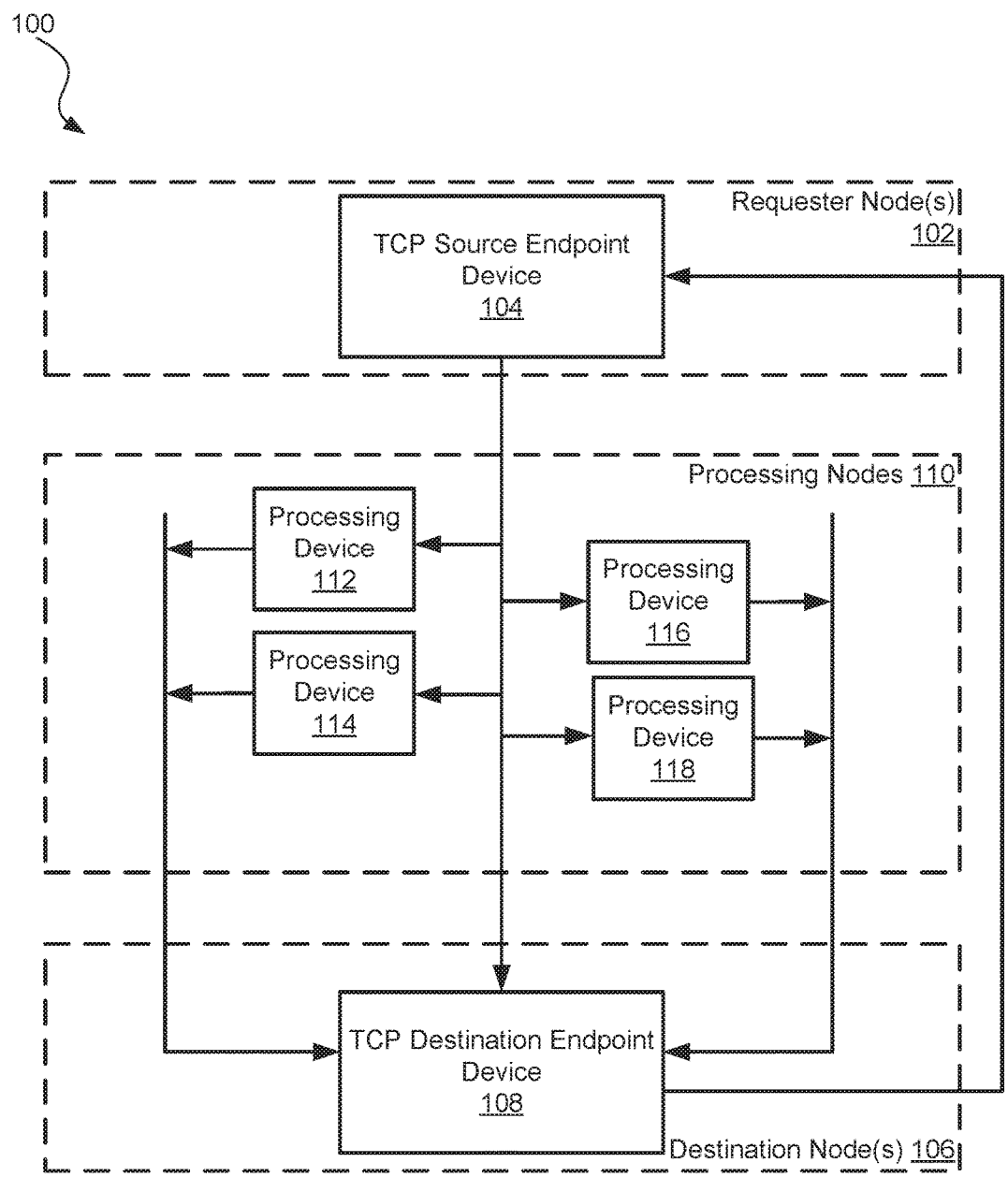
FIG. 1 is a block diagram illustrating a multicomputer system architecture for tapping network data and load balancing the processing of the network data among a plurality of processing devices, in accordance with various examples of the present disclosure.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The network configurations and load balancing techniques described herein address particular challenges associated with horizontally scaling processing operations corresponding to a large data stream. Using traditional load balancing techniques, an entire data stream may be assigned to a single processing device. This may cause the processing device to fail when large amounts of data are transmitted in the data stream. Attempts to address this problem using proxies or message queues have increased the amounts of data that can be processed in a data stream, but are associated with high processing overheads and/or provide bottlenecks that are prone to failure. Thus, while existing data processing techniques have been generally adequate, the techniques provided herein provide improved performance and efficiency.

Various examples described herein provide techniques that improve the processing of data streams. A destination node that receives a data stream is configured to maintain a network session and disregard at least some data that is communicated in the data stream. Accordingly, the destination node is able to receive large amounts of data without becoming overloaded by attempting to process the large amount of data. Processing nodes intercept the data stream as it is transmitted over the network. The processing nodes filter that data so that processing operations corresponding to various portions of the data stream are distributed among the processing nodes. The processing nodes communicate their responses to the destination node, which forwards the responses to the source node. Accordingly, the data processing of the data stream is effectively spread among the processing nodes while allowing the destination node to maintain the network session and respond to the source node.

These improvements are beneficial and advantageous for allowing processing operations corresponding to a data stream to be distributed among multiple processing devices, thus allowing more data to be processed with improved network response times and processing speeds. Of course, it is understood that these features and advantages are shared among the various examples herein and that no one feature or advantage is required for any particular embodiment.

FIG. 1 illustrates a multicomputer system architecture 100 for tapping network data and load balancing the processing of the network data among a plurality of processing devices, in accordance with various examples of the present disclosure.

The multicomputer system architecture 100 includes one or more requester nodes 102. The requester nodes 102 may be structured to include one or more clusters of computing devices operating together and/or one or more independently operating computing devices. The requester nodes 102 include one or more computing devices (e.g., TCP source endpoint device 104) that generate network traffic, such as by issuing transaction requests, sending messages, or communicating other types of data signals via a network. In the present example, these data signals are communicated by establishing at least one transmission control protocol (TCP) session over a network and sending the data signals via the TCP session using a data stream. These data signals may be structured according to the INTERNATIONAL ORGANIZATION FOR STANDARDIZATION (ISO) 8583 standard or any other appropriate data format.

The multicomputer system architecture 100 includes one or more destination nodes 106. The destination nodes 106 may be structured to include one or more clusters of computing devices operating together and/or one or more independently operating computing devices. The destination nodes 106 include one or more computing devices (e.g., TCP destination endpoint device 108) that receive network traffic from the requester nodes 102. As illustrated in this example, the TCP destination endpoint device 108 is structured to establish a communication session with the TCP source endpoint device 104 and to receive network traffic from the TCP source endpoint device 104 during the communication session. As described above, the multicomputer data architecture 100 may structure data transmissions between the TCP source endpoint device 104 and the TCP destination endpoint device 108 as ISO 8583 communications that are transmitted in one or more data streams via one or more established TCP sessions. In other examples, other communication or data transfer techniques may be used to communicate data between the requester nodes 102 and the destination nodes 106.

In some examples, the communications between the requester nodes 102 and the destination nodes 106 may be structured to include payment-related or other transaction data. This data may include, for example, messages that are formatted to include a header, one or more bitmaps, and/or other data elements. Each header may be structured to include a transaction identifier and other identifying information corresponding to a particular transaction. The one or more bitmaps may be structured to specify data elements that are included in a message. The data elements may be structured to specify other transaction identifiers, which may include, for example, a personal account number (PAN) corresponding to a payment method. Accordingly, in some examples, the multicomputer systems architecture 100 may be structured to perform operations corresponding to transaction processing, such as authenticating and/or performing transactions.

For the purpose of simplicity, a single TCP source endpoint device 104 and a single TCP destination endpoint device 108 are illustrated. However, as described above, there may be a plurality of requester nodes 102 and destination nodes 106. Moreover, requester nodes 102 and destination nodes 106 may communicate using other protocols in addition to or instead of TCP. However, using TCP as an example, the multicomputer architecture 100 may structure a TCP network communication session between the TCP source endpoint device 104 and the TCP destination endpoint device 108. The TCP source endpoint device 104 may be structured to initiate the session by sending a request to the TCP destination endpoint device 108. Responsive to the request, the TCP destination endpoint device 108 may acknowledge the request and synchronize communications with the TCP source endpoint device 104. In some examples, the session is identified by a session identifier, and data is transmitted during the session using packets. TCP source endpoint device 104 and the TCP destination endpoint device 108 may be structured to maintain the session and avoid session timeout by including sequence numbers in the packets and acknowledging receipt of packets by sending acknowledgement packets.

As described above, the multicomputer systems architecture 100 is structured to communicate information between computing devices using a network. A network may include one or more public and/or private networks, which may be comprised of network devices that transfer data via wired and/or wireless transmission media.

The multicomputer system architecture 100 includes processing nodes 110 that are positioned in the network between the requester nodes 102 and the destination nodes 106. The processing nodes 110 are structured to include a plurality of computing devices (e.g., processing devices 112, 114, 116, and 118). The processing nodes 110 are structured as computing devices that receive data corresponding to the network traffic communicated between the requester nodes 102 (e.g. TCP source endpoint device 104) and destination nodes 106 (e.g., TCP destination endpoint device 108).

The processing nodes 110 are illustrated in this example as including four processing devices for the purpose of simplicity. In other examples there may be any number of processing devices that may be communicatively coupled to network communications media in a variety of different ways. For example, the processing nodes 110 may be communicatively and physically coupled to transmissions media that transmits the network data between requester nodes 102 and destination nodes 106. In another example, the processing nodes 110 may include wireless transceivers that receive network traffic that is transmitted via wireless signals between one or more other devices The processing nodes 110 receive the data corresponding to the network traffic by tapping network data transmitted over the network between the requester nodes 102 and the destination nodes 106. The tapping of the network data broadly includes listening, monitoring, intercepting, mirroring, and any other form of receiving the data that is sent over the network between the requester nodes 102 and the destination nodes 106. Moreover, the tapped data may include all of the network data or any portion of the network data (e.g., one or more of the messages and/or packets that are included in the network data).

The processing nodes 110 may receive the network traffic via hardware and/or software that provides network tap, port mirror (e.g., a SWITCHED PORT ANALYZER (SPAN)), switching, and/or other technology that allows the processing nodes 110 to receive the network traffic. In some examples, the processing devices are each physically structured with the hardware and/or software that provides this receiving functionality. However, in other examples, the processing devices are communicatively coupled to other network devices that include the hardware and/or software for receiving the network traffic. For example, a separate port mirroring device may be structured to copy the network traffic and send the copy of the network traffic to one or more of the processing devices (e.g., processing device 112, 114, 116, and/or 118). Accordingly, each of the processing nodes 110 is structured to receive data corresponding to the network traffic, whether by receiving the network traffic directly or by receiving a copy of the network traffic. This received network traffic may include all or a portion of one or more ISO 8583 formatted message that are communicated in a data stream between a TCP source endpoint device 104 and a TCP destination endpoint device 108 during a communication session.

In addition to receiving the network traffic, each of the processing nodes 110 is structured to filter the network traffic. This filtering may be performed at OPEN SYSTEM INTERCONNECTION MODEL (OSI) layers above level 4, such as at the session layer (layer 5), presentation layer (layer 6), and/or the application layer (layer 7). In some examples, the processing nodes 110 are structured to filter the received network traffic by matching transaction identifiers included in the network traffic with transaction identifiers that are assigned to the processing nodes 110. For example, each of the processing nodes 110 may include a hash table or other data structure that may be used to filter portions of the network traffic. In some examples, processing nodes 110 are structured to parse transaction identifiers from the network traffic and input the transaction identifiers into the filters to determine which of the processing nodes 110 is assigned to process the portion of the network traffic that is associated with each transaction identifier. In more detail, processing device 112 may be assigned a range of transaction identifiers that are specified in a table data structure. The processing device 112 may be structured with a filter that parses transaction identifiers from the network traffic and determines which transaction identifiers are within the range of transaction identifiers by matching the transaction identifiers with the range of identifiers included in the table. Accordingly, the processing device 112 may recognize transaction identifiers in the network traffic that it is assigned to process, and then perform processing operations on any portions of the network traffic that are associated with the assigned transaction identifiers.

With respect to the ISO 8583 data format, a transaction identifier may be associated with a portion of network traffic by including the transaction identifier in a same message with the portion of the network traffic. In another example, the network traffic may include transaction identifiers on particular data packets. Including identifiers in messages and/or packets are some of the ways in which network traffic may be associated with the identifiers. Various other tagging, data formatting, and other techniques may also be used to provide identifiers corresponding to different portions of the network traffic.

In some examples, a processing device included in the processing nodes 110 may be structured as a management node that actively monitors a workload corresponding to other processing nodes 110 and coordinates with the other processing nodes 110 to assign a range of transaction identifiers to the other processing nodes 110. The management node may be structured to adjust transaction identifier assignments on the fly based on the workload corresponding to each processing device. For example, processing nodes 110 that are heavily burdened may be assigned a smaller subset of the of the transaction identifiers while processing nodes 110 that are lightly burdened may be assigned a larger subset of the transaction identifiers. In other examples, transaction identifier assignments may be user-specified and/or pre-configured.

Each of the processing nodes 110 is structured to perform data processing operations corresponding to the portion of the network traffic that it is assigned (e.g., based on the transaction identifiers). In some examples, the data processing operations include performing database searches and/or querying remote computing devices to determine whether to authenticate a transaction corresponding to a portion of the network traffic. Moreover, the data processing operations may include generating one or more responses regarding the authentications, such as by sending responses authorizing or declining particular transactions.

The processing nodes 110 are structured to communicate the responses to the destination nodes 106. In the present example, because the processing nodes 110 are tapping the network traffic from the requester nodes 102, the requester nodes 102 (e.g., TCP source endpoint device 104) may be aware of the destination nodes 106 but unaware of the processing nodes 110. Accordingly, the destination nodes 106 (e.g., TCP destination endpoint device 108) are structured to receive the responses from the processing nodes 110. These responses may be communicated from the processing nodes 110 to the destination nodes 106 in a variety of different ways. For example, each processing node 110 may establish a TCP session with the TCP destination endpoint device 108 to communicate the responses to the TCP destination endpoint device 108.

The destination nodes 106 are structured to communicate the responses received from the processing nodes 110 to the requester nodes 102. For example, TCP destination endpoint device 108 may establish a TCP session with each of the processing nodes 110. The TCP destination endpoint device 108 may receive the responses from the processing nodes 110 via the sessions, and communicate the responses to the TCP source endpoint device 104 via a session established between the TCP source endpoint device 104 and the TCP destination endpoint device 108. Accordingly, from the perspective of the TCP source endpoint device 104, these responses may appear to have been originated from the TCP destination endpoint device 108 rather than from the processing nodes 110.

In some examples, the TCP destination endpoint device 108 is structured as a proxy computing device that functions to establish sessions with external computing devices, receive network traffic from one or more requester nodes 102, and pass responses from the processing nodes 110 to the requester nodes 102. The TCP destination endpoint device 108 may receive outputs corresponding to the data processing from the processing nodes, rather than having to generate the outputs itself. Accordingly, the TCP destination endpoint device 108 may ignore or discard portions of the network traffic. Thus, while the TCP destination endpoint device 108 may receive a large amount of data in a data stream from a TCP source endpoint device 104, the TCP destination endpoint device 108 may generally avoid generating the content of the responses to network traffic, and instead rely upon the content of the responses generated by the processing nodes 110. Thus, the TCP destination endpoint device 108 may focus its workload on keeping TCP sessions alive and quickly responding to requests with the responses received from the processing nodes 110. These techniques allow the multicomputer architecture 100 to provide destination nodes 106 that are each capable of keeping network connections alive with requester nodes 102 without becoming overloaded by any large data streams.

Figure 2:
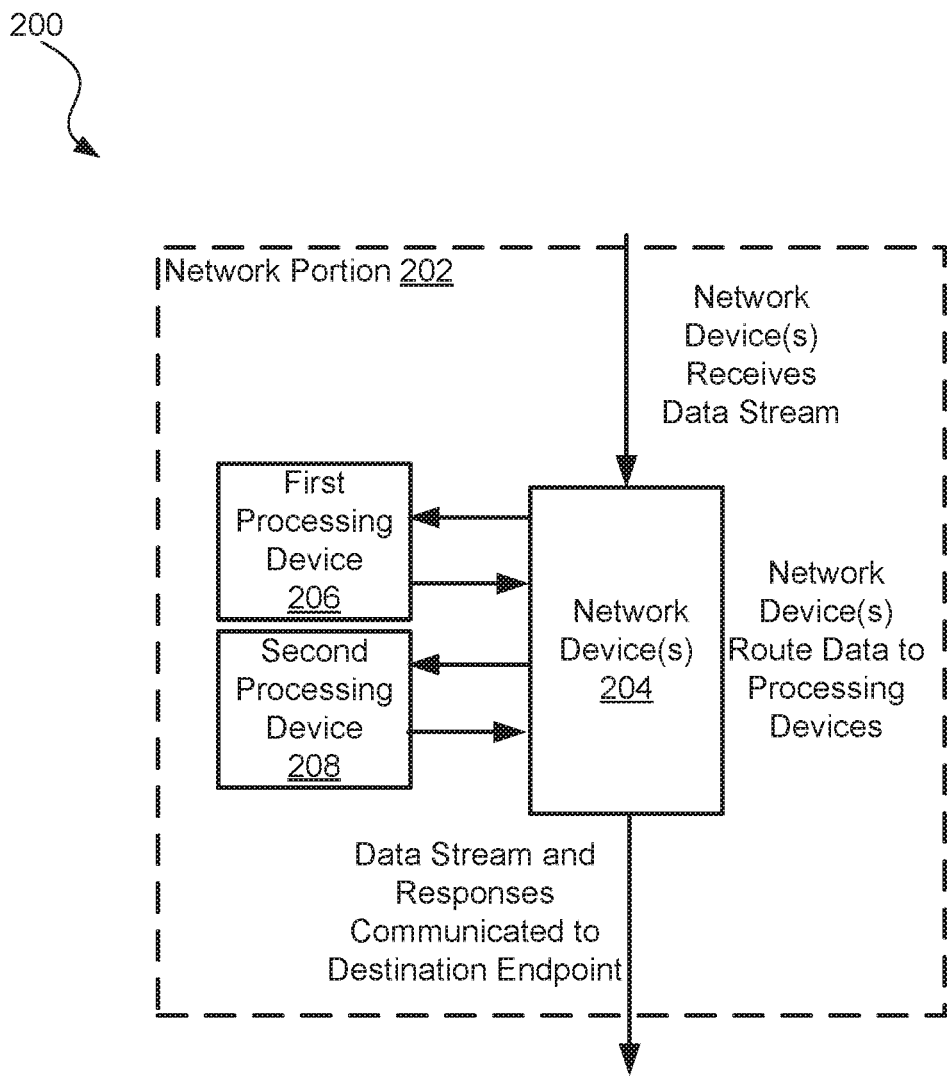
FIG. 2 is a block diagram illustrating a network architecture that distributes a data stream to processing devices that perform operations corresponding to the data stream, in accordance with various examples of the present disclosure.

FIG. 2 illustrates a network architecture 200 that distributes a data stream to processing devices that perform operations corresponding to the data stream, in accordance with various examples of the present disclosure.

The network architecture 200 includes a view of a network portion 202 that transmits data between endpoint devices. In the present example the network portion 202 includes at least one network device 204 that receives network traffic communicated over the network between a source endpoint device and a destination endpoint device. The at least one network device 204 includes at least one network tap and/or port mirroring network device that allows the network traffic to be received and communicated to processing devices (e.g., the first processing device 206 and/or second processing device 208).

The network device 204 is structured to provide the data communications that it receives to the first processing device 206 and the second processing device 208. For example, if the at least one network device 204 includes a network tap, the network tap allows the first processing device 206 and/or the second processing device 208 to listen to the communications that are passed between the endpoint devices. In other examples, if the at least one network device 204 includes a port mirroring network device, the port mirroring network device copies data that is transmitted between the endpoint devices and sends the copied data to the first processing device 206 and/or the second processing device 208.

In some examples, the one or more network devices 204 include a single network device that communicates the data to the first processing device 206 and the second processing device 208. For example, the network device 204 may include a network switch that routes a copy of the network traffic to each processing device as well as to the destination endpoint device. In other examples, the network device 204 includes a plurality of network devices that are each coupled to a separate processing device. For example, the network devices 204 may include a plurality of network tap devices, with each processing device being coupled to a separate network tap device. Further, in some examples, the one or more network devices 204 may be structured as a computing device that includes one or more virtual network devices that receive the network traffic and communicate data corresponding to the network traffic to the first processing device 206 and/or the second processing device 208.

The first processing device 206 and the second processing device 208 are structured to process portions of the network traffic received from the network device 204 and to generate responses/outputs based on the data included in the portions of the network traffic. These outputs generated on the first processing device 206 and the second processing device 208 are communicated to the destination endpoint device that is the target of the network traffic from the source endpoint device. The generated outputs from the processing devices may be communicated to the destination endpoint device via the network device 204 and/or one or more other network devices.

Figure 3:
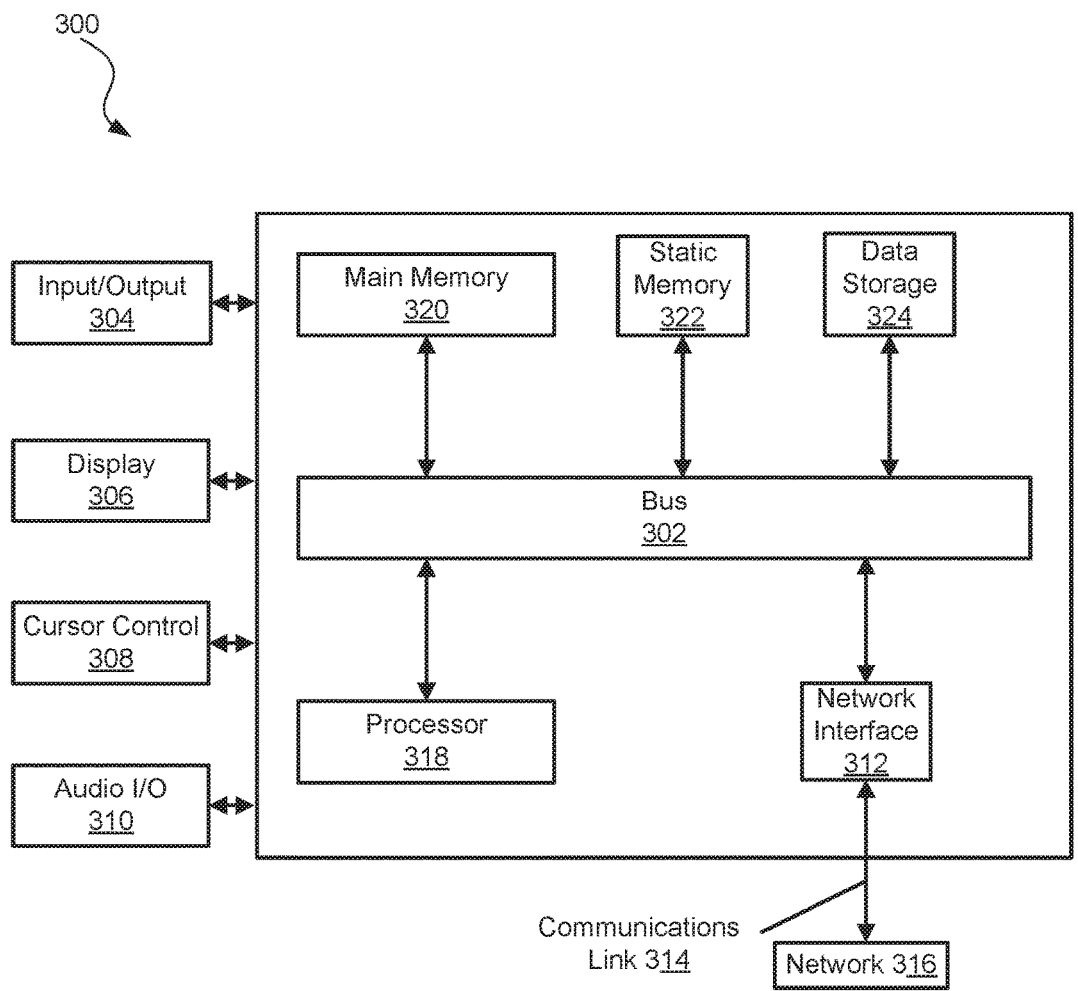
FIG. 3 is a block diagram illustrating a computer system suitable for implementing one or more computing devices.

FIG. 3 illustrates a computer system 300 suitable for implementing one or more computing devices. In various implementations, computer system 300 may structure a computing device as a mobile phone, a computing tablet, a desktop computer, laptop, wearable device, rack mount server, or any machine capable of executing a set of instructions (sequential or otherwise) that specify actions to be taken by that machine.

Computer system 300 may include a bus 302 or other communication mechanisms for communicating information data, signals, and information between various components of computer system 300. Components include an I/O component 304 that processes a user action, such as selecting keys from a keypad/keyboard, selecting one or more buttons, links, actuatable elements, etc., and sends a corresponding signal to bus 302. I/O component 304 may also include an output component, such as a display 306 and a cursor control 308 (such as a keyboard, keypad, mouse, touch screen, etc.). An optional audio I/O component 310 may also be included to allow a user to hear audio and/or use voice for inputting information by converting audio signals.

A network interface 312 transmits and receives signals between computer system 300 and other devices, such as user devices, data servers, and/or other computing devices via a communications link 314 and a network 316 (e.g., such as a LAN, WLAN, PTSN, and/or various other wired or wireless networks, including telecommunications, mobile, and cellular phone networks).

The processor 318 represents one or more processing devices such as a microprocessor, central processing unit, or the like. More particularly, processor 318 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 318 may also be one or more special-purpose processing devices such as an application specific integrated circuit (ASIC), a field programmable gate array (FPGA), a digital signal processor (DSP), network processor, or the like. Processor 318 is configured to execute instructions for performing the operations and steps discussed herein.

Components of computer system 300 also include a main memory 320 (e.g., read-only memory (ROM), flash memory, dynamic random access memory (DRAM) such as synchronous DRAM (SDRAM), double data rate (DDR SDRAM), or DRAM (RDRAM), and so forth), a static memory 322 (e.g., flash memory, static random access memory (SRAM), and so forth), and a data storage device 324 (e.g., a disk drive).

Computer system 300 performs specific operations by processor 318 and other components by executing one or more sequences of instructions contained in main memory 320. Logic may be encoded in a computer readable medium, which may refer to any medium that participates in providing instructions to processor 318 for execution. Such a medium may take many forms, including but not limited to, non-volatile media, volatile media, and/or transmission media. In various implementations, non-volatile media includes optical or magnetic disks, volatile media includes dynamic memory, such as main memory 320, and transmission media between the components includes coaxial cables, copper wire, and fiber optics, including wires that comprise bus 302. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 314 to the network 316 may perform instruction sequences to practice the present disclosure in coordination with one another. Modules described herein may be embodied in one or more computer readable media or be in communication with one or more processors to execute or process the steps described herein.

Figure 4:
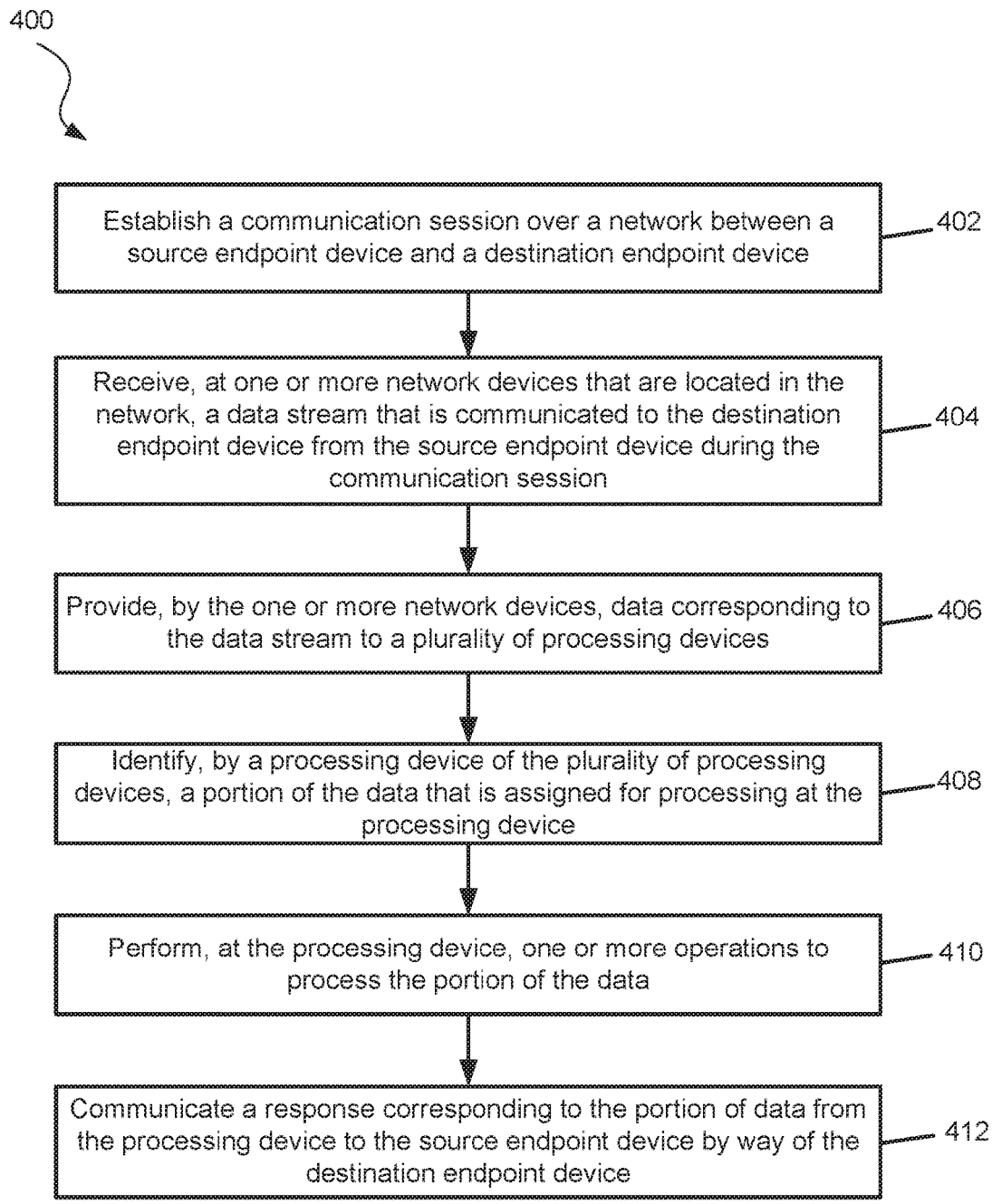
FIG. 4 is a flow diagram illustrating a method for horizontally scaling transaction processing among a plurality of processing devices, in accordance with various examples of the present disclosure.

FIG. 4 illustrates a method 400 for horizontally scaling transaction processing among a plurality of processing devices, in accordance with various examples of the present disclosure. In some examples, the method 400 is implemented by one or more processors executing computer-readable instructions to perform the functions described herein. It is understood that additional steps can be provided before, during, and after the steps of method 400, and that some of the steps described can be replaced or eliminated in other examples.

At action 402, a source endpoint device establishes a TCP session with a destination endpoint device. The endpoint devices communicate via the TCP session over a network that transmits packets corresponding to the TCP session. These packets may be included as part of a TCP data stream that is sent from the source endpoint device to the destination endpoint device. In some examples, the network traffic corresponding to the data stream is formatted according to the ISO 8583 communication standard. While the communications are described in this example as including a TCP session and the ISO 8583 format, in other examples other protocols and standards may be implemented to transmit the data.

The destination endpoint device may keep the TCP session alive by acknowledging receipt of the data from the source endpoint device, but not actually performing data processing operations on all of the received data. In this respect, the destination endpoint device may be regarded as a dumb terminal or proxy device.

At action 404, one or more network devices in the network receive the data stream as it is passed between the source endpoint device and the destination endpoint device. The receiving of the data stream may include tapping the data stream to listen to data included in the data stream, copying the data stream, or any other technique to monitor the data included in the data stream.

At action 406, the one or more network devices provide the data corresponding to the data stream to a plurality of processing devices. In some examples, the one or more network devices include a network tap that is communicatively coupled to at least one network medium that transmits data between the source endpoint device and the destination endpoint device. The network tap allows one or more of the processing devices to listen to the data of the data stream as the data is transmitted over the network. In other examples, the one or more network devices include a port mirror that is communicatively coupled to at least one network medium that transmits data between the source endpoint device and the destination endpoint device. The port mirror reads the data from the data stream and transmits a copy of the data to the one or more processing devices. Accordingly, the data corresponding to the data stream is communicated to the processing devices so that the processing devices may receive and parse the data.

In some examples, the one or more network devices receive the data corresponding to the data stream by monitoring the data stream as other network devices provide the data stream to the destination endpoint device. In other examples, the one or more network devices may actively participate in passing the network traffic that is part of the data stream to the destination endpoint device. For example, the one or more network devices may include a switch that receives the data stream from the network and routes the data stream to the destination endpoint device while also routing a copy of the data stream to the plurality of processing devices.

At action 408, the processing devices parse the received data corresponding to the data stream to identify portions of the data stream that are assigned to each processing device. In the present example, a first processing device of the plurality of processing devices reads a transaction identifier that is associated with a first portion of the data corresponding to the data stream. The first processing device matches the transaction identifier with one or more transaction identifiers that are assigned to the first processing device. In some examples, the matching is performed by hashing the transaction identifier to determine a hash value, and using the hash value to determine whether the first processing device is assigned to process transactions corresponding to the transaction identifier. For example, a hash table may map transaction identifiers to hash values and hash values to outputs that determine whether a processing device is assigned to a parsed transaction identifier. In another example, the first processing device may match a parsed transaction identifier with a list or table of transaction identifiers that is stored on the first processing device. Accordingly, based on the matching and/or hashing of the transaction identifier, the first processing device identifies that the first portion of the data is assigned for processing by the first processing device.

Similarly, a second processing device may parse the transaction identifier and determine that the second processing device is not assigned to process transactions associated with the transaction identifier. For example, the transaction identifier may not match transaction identifiers included in a list or table on the second processing device. Accordingly, the second processing device may discard, ignore, or otherwise disregard the first portion of the data stream. However, the second processing device may parse a second transaction identifier that is associated with a second portion of the data stream. The second processing device may match and/or hash the second transaction identifier to identify that the second portion of the data stream is assigned to be processed by the second processing device. Accordingly, the second processing device may process the second portion of the data, but not the first portion of the data.

At action 410, the first processing device parses the first portion of the data and performs one or more operations to process the first portion of the data. The one or more operations may include querying a local or remote database to determine whether one or more transactions specified in the first portion of the data are authorized. For example, the first processing device may message a remote payment processing server that is associated with a customer's personal account number (PAN) to determine whether to authorize a payment by the customer. Similarly, the second processing device may determine whether one or more other transactions specified in the second portion of the data are authorized.

At action 412, the first payment processor communicates one or more outputs/responses corresponding to the processing of the first portion of the data. A response may include, for example, one or more messages indicating that a transaction is authorized or declined. The response(s) are communicated from the first processing device to the destination endpoint device via the network. Similarly, the second processing device communicates to the destination endpoint device one or more other responses corresponding to its processing of the second portion of the data.

The destination endpoint device receives the one or more response from the first processing device, as well as any other responses from other processing devices (e.g., the one or more other responses received from the second processing device). The destination endpoint device communicates the responses received from the processing devices to the source endpoint device. In the present examples, these responses are communicated via a data stream between the destination endpoint device and the source endpoint device. The destination endpoint device may communicate the responses to the source endpoint device as though the responses were generated on the destination endpoint device. For example, the destination endpoint device may insert the responses into one or more data streams included in the TCP session that is established between the source endpoint device and the destination endpoint device. The destination endpoint device may assign the responses to particular packets having particular sequence numbers such that the responses are accepted by the source endpoint device as responsive to the network data sent from the source endpoint device to the destination endpoint device via the TCP session.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a non-transitory memory; and
one or more hardware processors coupled to the non-transitory memory and configured to read instructions from the non-transitory memory to cause the system to perform operations comprising:
   detecting a communication session established over a network between a source endpoint device and a destination endpoint device;
   intercepting, at one or more network devices that are located in the network between the source endpoint device and the destination endpoint device, a data stream transmitted via the communication session from the source endpoint device and intended for the destination endpoint device, wherein the data stream comprises a plurality of transaction requests;
   identifying, by the one or more network devices, portions of the data stream corresponding to a subset of the plurality of transaction requests for processing by a plurality of processing devices separate from the destination endpoint device;
   distributing, by the one or more network devices, the portions of the data stream to the plurality of processing devices, wherein the destination endpoint device is configured to ignore the portions of the data stream;
   processing, by each of the plurality of processing devices, a corresponding portion of the data stream to generate a corresponding response;
   transmitting, by each of the plurality of processing devices, the corresponding response to the destination endpoint device; and
   causing the destination endpoint device to transmit the corresponding responses received from the plurality of processing devices to the source endpoint device as responses to the subset of the plurality of transaction requests via the communication session.

2. The system of claim 1, wherein the one or more network devices include a network tap that is communicatively coupled to the network between the source endpoint device and the destination endpoint device.

3. The system of claim 1, wherein the one or more network devices include a port mirroring device that is communicatively coupled to the network between the source endpoint device and the destination endpoint device.

4. The system of claim 1, wherein the data stream includes a Transmission Control Protocol (TCP) data stream that provides one or more messages formatted according to the ISO 8583 standard.

5. The system of claim 1, wherein the identifying comprises:
parsing a first portion of the data stream to extract a first transaction identifier associated with a first transaction request; and
determining, from the one or more processing devices, a first processing device assigned to process the first transaction request based on the extracted first transaction identifier, and wherein the distributing comprises distributing the first portion of the data stream to the first processing device.

6. The system of claim 5, wherein the processing comprises processing, by the first processing device, the first portion of the data stream to generate a first response, and wherein the transmitting comprises communicating, by the first processing device, the first response corresponding to the processing of the first portion of the data stream to the destination endpoint device.

7. The system of claim 6, wherein the first transaction request comprises a request to authenticate a transaction corresponding to the first transaction identifier, and wherein the first response indicates that the transaction is authenticated.

8. A non-transitory machine-readable medium having stored thereon machine-readable instructions executable to cause a machine to perform operations comprising:
detecting a communication session established over a network between a source endpoint device and a destination endpoint device;
intercepting a data stream transmitted via the communication session from the source endpoint device and intended for the destination endpoint device, wherein the data stream comprises a plurality of transaction requests;
identifying portions of the data stream corresponding to a subset of the plurality of transaction requests for processing by a plurality of processing devices different from the destination endpoint device;
distributing the portions of the data stream to the plurality of processing devices according to a load balancing setting for the plurality of processing devices, wherein the destination endpoint device is configured to discard the portions of the data stream;
causing each of the plurality of processing devices to process a corresponding portion of the data stream to generate a corresponding response;
communicating the corresponding responses corresponding to the processing of the corresponding portions of the data stream to the destination endpoint device; and
causing the destination endpoint device to transmit the corresponding responses generated by the plurality of processing devices to the source endpoint device as responses to the subset of the plurality of transaction requests via the communication session.

9. The non-transitory machine-readable medium of claim 8, wherein the machine comprises a network tap that is communicatively coupled to the network between the source endpoint device and the destination endpoint device.

10. The non-transitory machine-readable medium of claim 8, wherein the machine comprises a port mirroring device that is communicatively coupled to the network between the source endpoint device and the destination endpoint device.

11. The non-transitory machine-readable medium of claim 8, wherein the identifying comprises:
extracting a first transaction identifier from a first portion of the data stream; and
determining, from the plurality of processing devices, a first processing device assigned to process the first portion of the data stream based on the extracted first transaction identifier.

12. The non-transitory machine-readable medium of claim 11, wherein the distributing comprises transmitting the first portion of the data stream to the first processing device, and wherein the communicating comprises communicating a first response generated based on the first processing device processing the first portion of the data stream to the destination endpoint device.

13. The non-transitory machine-readable medium of claim 8, wherein a first portion of the data stream is distributed to a first processing device from the plurality of processing devices and comprises a request to authorize a transaction, and wherein a first response generated by the first processing device indicates that the transaction is declined.

14. A method comprising:
  detecting, by one or more network devices, a communication session established over a network between a source endpoint device and a destination endpoint device;
  intercepting, by the one or more network devices, a data stream transmitted via the communication session and intended for the destination endpoint device, wherein the data stream comprises a plurality of transaction requests;
  identifying, by the one or more network devices, portions of the data stream corresponding to a subset of the plurality of transaction requests for processing by a plurality of processing devices separate from the destination endpoint device;
  distributing, by the one or more network devices, the portions of the data stream to the plurality of processing devices, wherein the destination endpoint device is configured to ignore the portions of the data stream;
  processing, by each of the plurality of processing devices, a corresponding portion of the data stream to generate a corresponding response;
  communicating, by each of the plurality of processing devices, the corresponding response to the destination endpoint device; and
  causing the destination endpoint device to transmit the corresponding responses received from the plurality of processing devices to the source endpoint device as responses to the subset of the plurality of transaction requests via the communication session.

15. The method of claim 14, wherein the one or more network devices include a network tap that is communicatively coupled to the network between the source endpoint device and the destination endpoint device.

16. The method of claim 14, wherein the one or more network devices include a port mirroring device that is communicatively coupled to the network between the source endpoint device and the destination endpoint device.

17. The method of claim 14, wherein the data stream includes a Transmission Control Protocol (TCP) data stream that provides one or more messages formatted according to the ISO 8583 standard.

18. The method of claim 14, wherein the identifying comprises hashing a transaction identifier that is parsed from a first portion of the data stream to determine that a first processing device from the plurality of processing devices is assigned to process the first portion of the data stream, and wherein the processing comprises processing, by the first processing device, the first portion of the data stream to generate a first response.

19. The method of claim 18, wherein the communicating comprises communicating, by the first processing device, the first response corresponding to the processing of the first portion of the data to the destination endpoint device.

20. The method of claim 18, wherein the first portion of the data stream comprises a request to authenticate a transaction corresponding to the transaction identifier, and wherein the first response indicates that the transaction is authenticated.

* * * * *